(No Model.) 2 Sheets—Sheet 2.
W. G. DAVIS.
PIPE COUPLING.
No. 359,500. Patented Mar. 15, 1887.
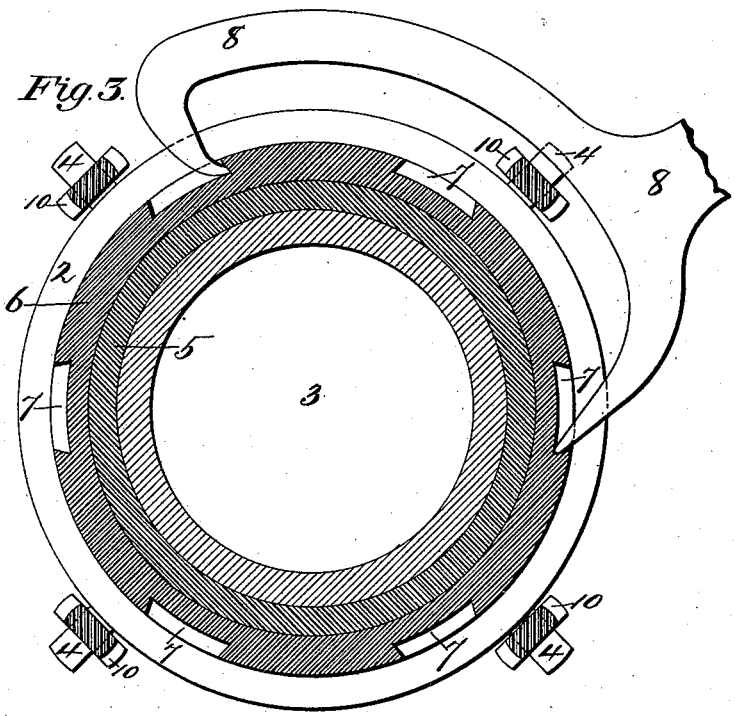
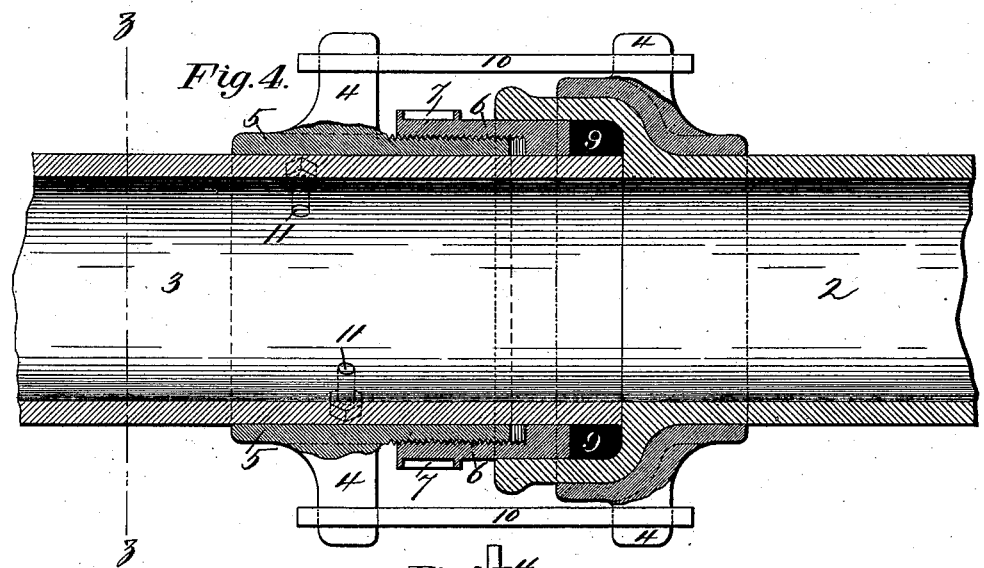
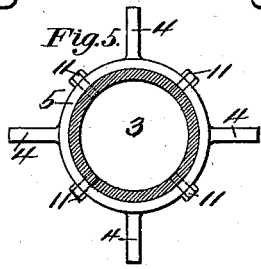
Witnesses.
Inventor.
William G. Davis
by Bakewell &Ken
his Attorneys

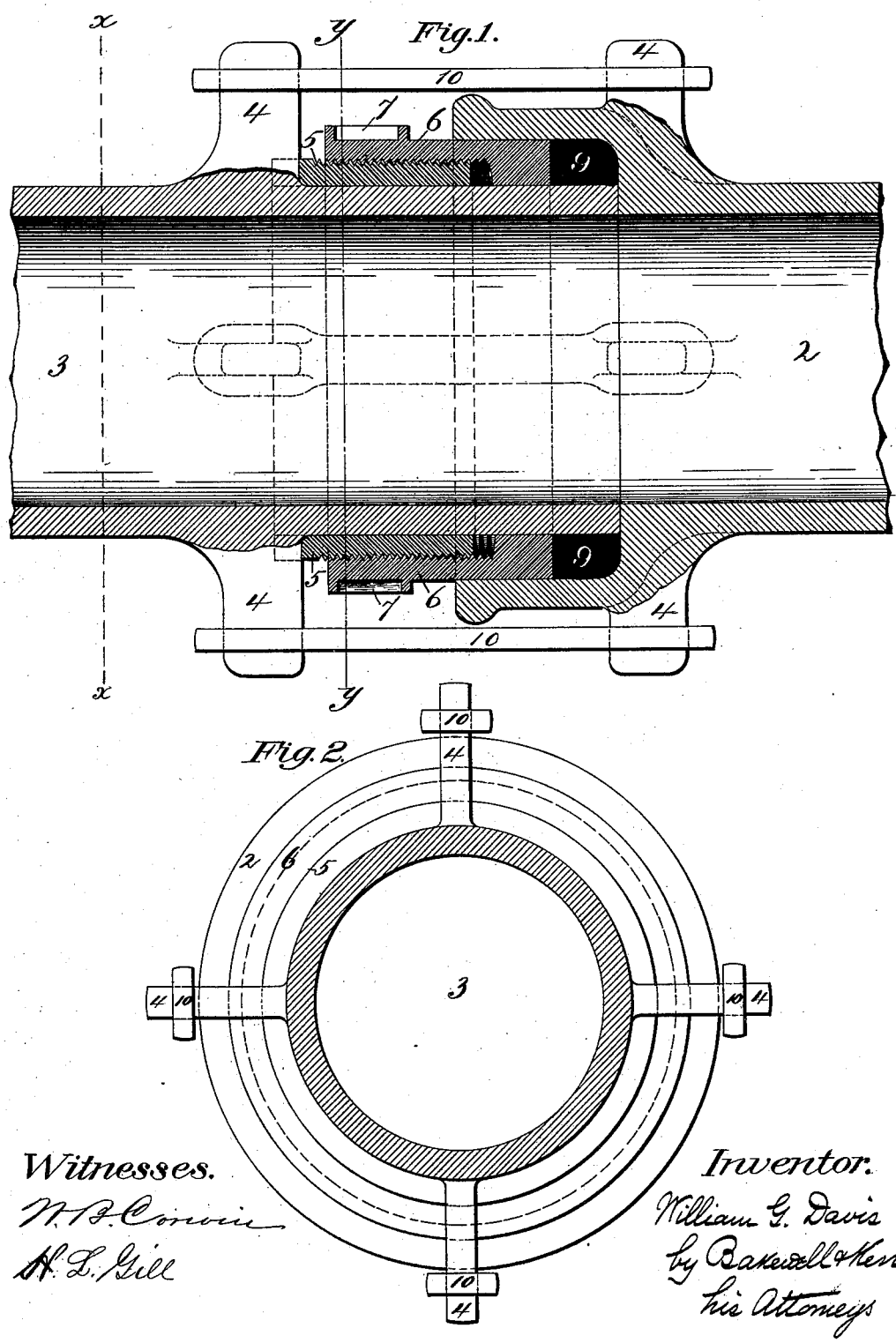

UNITED STATES PATENT OFFICE.

WILLIAM G. DAVIS, OF PITTSBURG, ASSIGNOR OF ONE-HALF TO ALVIN W. CAMPBELL, OF ALLEGHENY CITY, AND ENOCH DAVIS, OF PITTSBURG, PA.

PIPE-COUPLING.

SPECIFICATION forming part of Letters Patent No. 359,500, dated March 15, 1887.

Application filed June 4, 1886. Serial No. 204,108. (No model.)

*To all whom it may concern:*

Be it known that I, WILLIAM G. DAVIS, of Pittsburg, in the county of Allegheny and State of Pennsylvania, have invented a new and useful Improvement in Pipe-Couplings; and I do hereby declare the following to be a full, clear, and exact description thereof, reference being had to the accompanying drawings, forming part of this specification, in which—

Figure 1 is a vertical axial section of a pipe-coupling embodying my invention. Fig. 2 is a vertical cross-section on the line $x$ $x$ of Fig. 1. Fig. 3 is a vertical cross-section on the line $y$ $y$ of Fig. 1, showing the manner of tightening the joint. Fig. 4 is a longitudinal axial section of the coupling, illustrating a modification. Fig. 5 is a vertical cross-section on the line $z$ $z$ of Fig. 4, and is on a smaller scale than the other figures.

Like figures of reference indicate like parts in each.

In the drawings, 2 and 3 represent the ends of adjacent pipe-sections, of which the pipe 2 is bell-mouthed, and the end of the pipe 3 fits thereinto.

4 are knobs or bracket-arms which project from the outside of the pipes at points near to their ends, there being any suitable number of these knobs around the periphery of each pipe.

5 is a ring which encircles the pipe 3 forward of the knobs, and is prevented from turning thereon by being slotted and engaged with the knobs, Fig. 1. The outside of the ring 5 is screw-threaded, and is encircled by an internally-screw-threaded annulus, 6, whose outer periphery is angular or has sockets 7 for the reception of the ends of a wrench, 8, by which it may be turned on the fixed ring 5. Figs. 1 and 3. To connect the pipes a gasket, 9, of rubber, lead, or other compressible substance, is put in the bell-mouth of the pipe 2, and the end of the pipe 3 is inserted into the mouth, the gasket preferably encircling the end of the pipe 3. The end of the ring 6 then abuts against the gasket 9. Links 10 are then put on the knobs 4, so as to connect opposite knobs and to join the pipes, and the workman, by means of the wrench 8, screws the ring 6 on the inner ring, 5, toward the gasket 9. The ring 5 being fixed from rotating, and the pipes being connected by the links 10, the screwing up of the ring 6 has the effect of compressing the gasket 9 and of wedging it in very firmly to close the joint between the pipes. The pipes are thus coupled without being themselves turned, which in case of large pipes is a very material advantage. The purpose of the links 10 is to hold the pipes together against the strain of the compression of the gasket 9 when the pipe 6 is screwed forward; hence the form and number of these links are not essential. Any kind of connecting device may be used, and their number may be determined by the size of the diameter of the pipes. I intend to include such connecting devices by the generic term "link" used in the following claims.

If desired, the ring 5, instead of being separated from the pipe 3, may be made integral therewith in the form of an ordinary screw-thread on the outside of the pipe.

In the form of my invention shown in Figs. 1, 2, and 3 the knobs 4 are made integral with the pipes; but in Fig. 4 I show a form in which they are made separate and then fixed thereto. Here the ring 5 and the knobs 4 of the pipe 3 are made in a single piece, being an annular casting, and the knobs 4 of the pipe 2 are cast on a ring which fits around the rear of the bell-mouth. The ring 5 is bolted to the pipe by bolts 11. This form of my invention may be readily applied to pipes of the kind now in common use.

My improved coupling is cheap, easily operated, and produces a very tight joint for gas or water pipes.

I claim—

1. In a pipe-coupling, the combination, with adjacent pipe-sections fitting together, of an externally-screw-threaded ring made separate from but mounted on one of the pipe-sections so as to be prevented from rotation, an internally-threaded ring fitting thereon, and a gasket, substantially as and for the purposes described.

2. In a pipe-coupling, the combination, with adjacent pipe-sections fitting together, of a screw-threaded piece on one pipe-section, a threaded ring fitting thereon, a gasket situated next to the end of the threaded ring, and links connecting the pipe-sections, substantially as and for the purposes described.

3. In a pipe-coupling, the combination, with adjacent pipe-sections 2 and 3, fitting together, the pipe 3 having a lug on its outer periphery, of an externally-screw-threaded ring made separate from but mounted on the pipe 3 and engaging the lug, so as to be prevented from rotation, an internally-threaded ring fitting thereon, and a gasket, substantially as and for the purposes described.

In testimony whereof I have hereunto set my hand this 26th day of May, A. D. 1886.

WILLIAM G. DAVIS.

Witnesses:
W. B. CORWIN,
THOMAS W. BAKEWELL.